(12) United States Patent
Vydianathan et al.

(10) Patent No.: US 11,722,547 B2
(45) Date of Patent: *Aug. 8, 2023

(54) SYSTEM AND METHOD FOR A DATA INTERCHANGE HUB

(71) Applicant: ServiceNow, Inc., Santa Clara, CA (US)

(72) Inventors: Arun Vydianathan, Hyderabad (IN); Debraj Chakraborty, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,305

(22) Filed: Sep. 21, 2021

(65) Prior Publication Data

US 2022/0070281 A1    Mar. 3, 2022

Related U.S. Application Data

(63) Continuation of application No. 17/003,296, filed on Aug. 26, 2020, now Pat. No. 11,190,623.

(51) Int. Cl.
*H04L 67/01* (2022.01)
*H04L 9/40* (2022.01)
*H04L 67/02* (2022.01)
*H04L 67/51* (2022.01)

(52) U.S. Cl.
CPC .............. *H04L 67/01* (2022.05); *H04L 63/08* (2013.01); *H04L 67/02* (2013.01); *H04L 67/51* (2022.05)

(58) Field of Classification Search
CPC ......... H04L 67/01; H04L 63/08; H04L 67/02; H04L 67/51; H04L 67/10; H04L 69/08; H04L 63/168; H04L 69/18; H04L 63/0272
See application file for complete search history.

(56) References Cited

U.S. PATENT DOCUMENTS

| | | |
|---|---|---|
| 6,609,122 B1 | 8/2003 | Ensor |
| 6,678,887 B1 | 1/2004 | Hallman |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |

(Continued)

*Primary Examiner* — El Hadji M Sall
(74) *Attorney, Agent, or Firm* — Fletcher Yoder PC

(57) ABSTRACT

This disclosure is directed to a data interchange hub (DIH) server that serves as an intermediary to exchange data between applications hosted by a client instance and external services. The DIH server receives and stores registration data that enables it to connect to each of these external services and informs the server of the data formats that each of the external services are expected to receive and provide. Once the external services have been registered, the DIH server enables applications hosted by the client instance to send data to, and to receive data from, these external services, while seamlessly handling communication, authentication, and data conversion. Additionally, the DIH server can additionally or alternatively act as an intermediary to exchange data between the registered services. As such, the disclosed DIH server can provide a single point of access for applications hosted by the client instance and registered services to exchange data.

20 Claims, 8 Drawing Sheets

(56) References Cited

U.S. PATENT DOCUMENTS

| | | |
|---|---|---|
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Meuller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 2013/0095864 A1 | 4/2013 | Marovets |
| 2014/0379848 A1 | 12/2014 | Sabbouh |
| 2018/0137139 A1* | 5/2018 | Bangalore ........... G06F 16/2379 |
| 2018/0152336 A1 | 5/2018 | Ando et al. |
| 2019/0172566 A1 | 6/2019 | Schulman et al. |
| 2019/0287162 A1 | 9/2019 | Ismail et al. |
| 2020/0067907 A1* | 2/2020 | Avetisov ............... H04L 9/3239 |
| 2020/0334244 A1 | 10/2020 | Hanmmerschmidt et al. |
| 2021/0211509 A1* | 7/2021 | Ly ........................ H04L 67/51 |

\* cited by examiner

SYSTEM AND METHOD FOR A DATA INTERCHANGE HUB

CROSS-REFERENCE TO RELATED APPLICATION

This application is a continuation of U.S. patent application Ser. No. 17/003,296, filed Aug. 26, 2020, and entitled, "SYSTEM AND METHOD FOR A DATA INTERCHANGE HUB," which is incorporated by reference herein in its entirety for all purposes.

BACKGROUND

The present disclosure relates generally to data exchange between cloud computing platforms and various external services.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In certain situations, a client instance hosted by the cloud computing service may exchange information with systems or services outside of the client instance. For example, an application hosted by the client instance may make a request to an external service to request data related to a purchase order and receive a response from the external service that includes the requested data. However, it is presently recognized that various external services may be designed to communicate using particular protocols, which may involve different handshake processes, authentication credentials, and so forth. Further, these external services may be designed to receive and send data in particular formats, which may be different from the format in which the application hosted by the client instance expects to receive the data. As such, prior to the present disclosure, a developer typically would have to separately code the intricacies of connecting to each of the desired services using the desired protocols and encoding/decoding the data into the desired formats, which can substantially increase developer time, development cost, and the potential to introduce coding errors and regressions during application development.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a data interchange hub (DIH) server that serves as an intermediary to exchange data between applications hosted by a client instance and one or more external services. The disclosed DIH server includes a registration module that is designed to receive and suitably store registration data for each of the external services as part of a registration process. The registration data includes suitable information to enable the DIH server to connect to each of the external services, as well as information regarding the data formats that each of the external services are expected to receive and provide. Once the external services have been registered, the DIH server enables applications hosted by the client instance to send data to, and to receive data from, these external services, while seamlessly handling communication, authentication, and data format transformation. Additionally, once the services have been registered, the DIH server can additionally or alternatively act as an intermediary to exchange data between the services themselves. As such, the disclosed DIH server can provide a single point of access for applications hosted by the client instance and registered services to exchange data, reducing development time, increasing code recycling, and reducing the potential to introduce coding errors or regressions during development.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
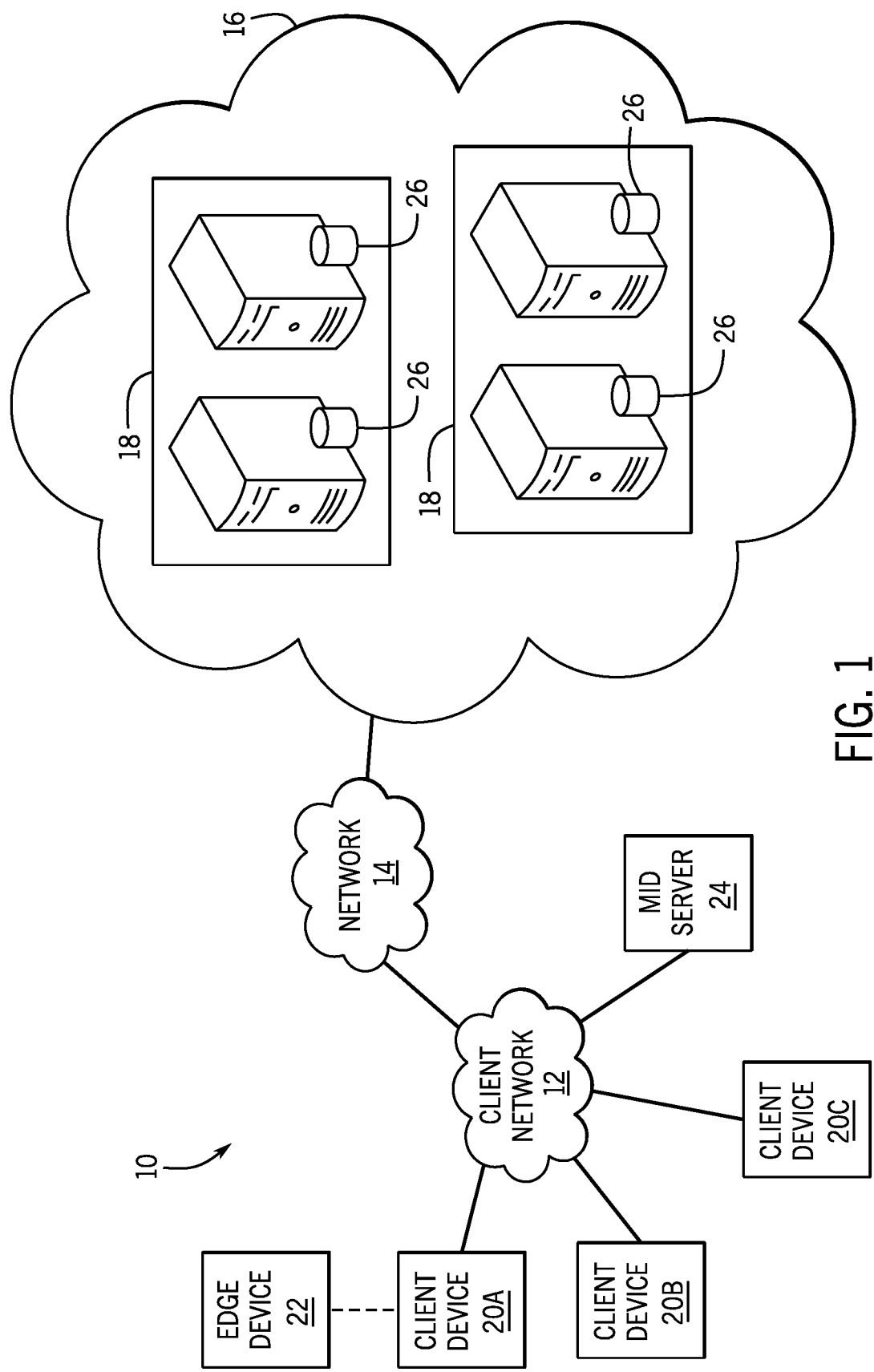
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a configuration management database (CMDB).

Present embodiments are directed to a data interchange hub (DIH) server that can act as an intermediary to exchange data between applications hosted by a client instance and one or more external services (hereinafter "services"). Once services have been registered with the DIH server, the DIH server enables applications hosted by the client instance to send data to, and to receive data from, these services. Additionally, once the services have been registered, the DIH server can additionally or alternatively act as an intermediary to exchange data between the services themselves. Based on information provided to the DIH server during the service registration process, the DIH server seamlessly handles communication, authentication, and data format translation when exchanging data. As such, the disclosed DIH server can provide a single point of access for applications hosted by the client instance and registered services to exchange data, reducing development time, increasing code recycling, and reducing the potential to introduce coding errors or regressions during application development.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
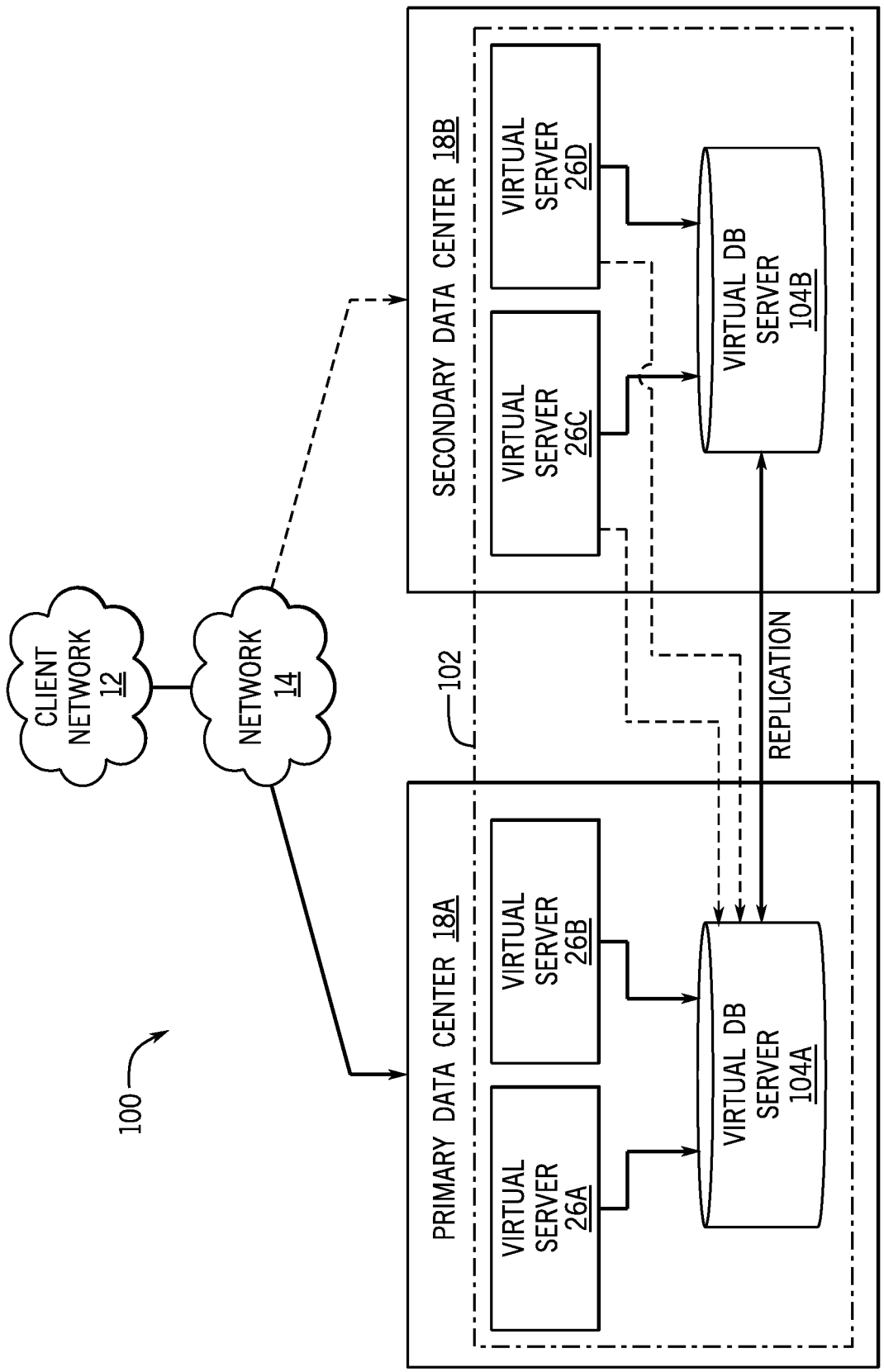
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
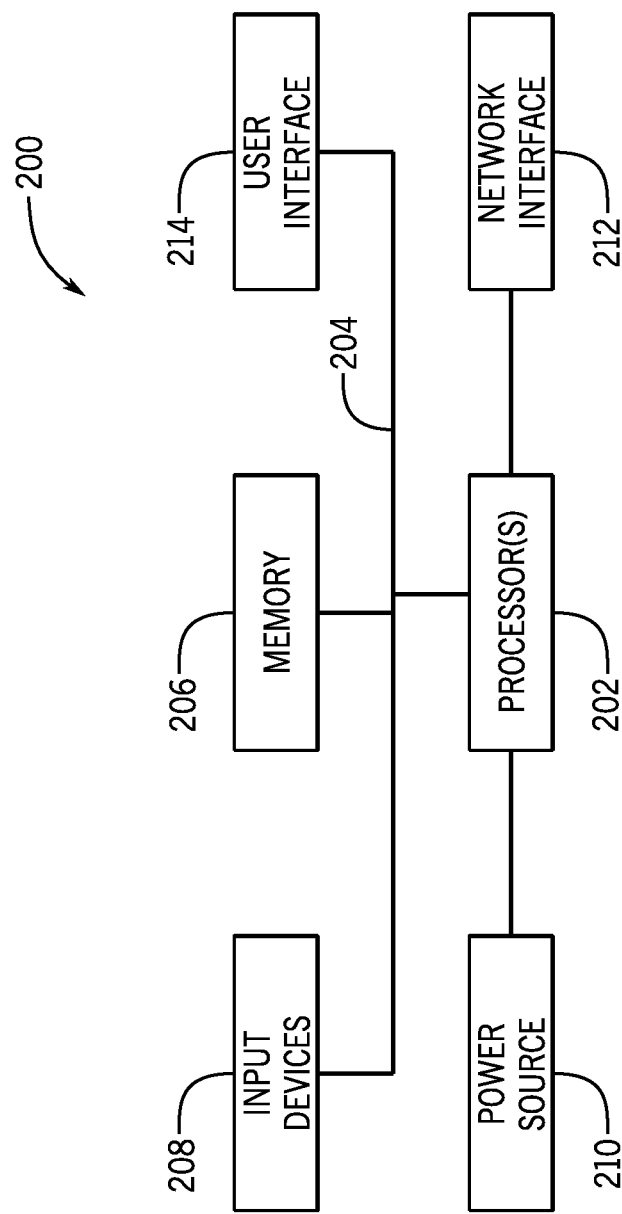
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
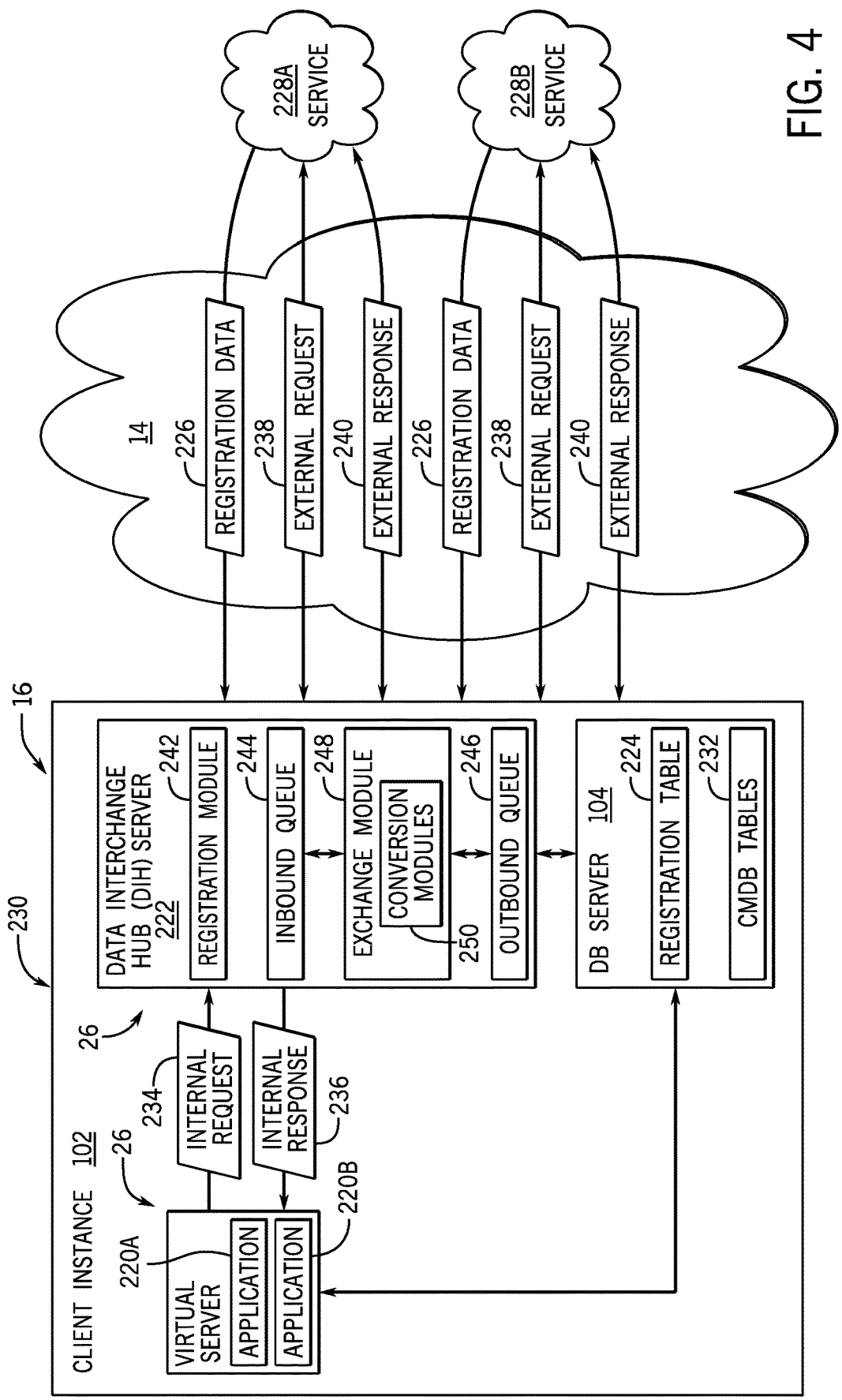
FIG. 4 is a block diagram illustrating an embodiment in which a client instance includes a data interchange hub (DIH) server that enables data exchange between one or more applications hosted by the client instance and one or more external services communicatively coupled to the client instance, in accordance with aspects of the present disclosure.

With the preceding in mind, FIG. 4 is a block diagram illustrating an embodiment in which a virtual servers 26 support and enables the client instance 102, according to one or more disclosed embodiments. More specifically, FIG. 4 illustrates an example of a portion of a service provider cloud infrastructure, including the cloud-based platform 16 discussed above. As noted herein, the cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

More specifically, for the embodiment illustrated in FIG. 4, the client instance 102 includes virtual servers 26 hosting an applications 220 (e.g., application 220A and application 220B) and a data interchange hub (DIH) server 222. In certain embodiments, both the applications 220 and the DIH server 222 may be hosted by the same virtual server 26, while in other embodiments, they may be hosted by separate virtual servers 26 associated with the client instance 102. The applications 220 include instructions that are interpreted and/or executed by the virtual server 26 to provide functionality to users of the client instance 102. For example, the applications 220 may include an application that enables users to place orders for products from a vendor, an application to view and manage CMDB data, an application to request payroll reports, an application to view and analyze vulnerability data, an application to manage human resources, and so forth.

The client instance 102 includes and is supported by DB server 104. The illustrated DB server 104 includes a registration table 224 that, as discussed below, stores registration data 226 for one or more services 228 with which the client instance 102 exchanges data. In certain embodiments, the client instance 102 hosts a CMDB 230. For such embodiments, the illustrated DB server 104 includes one or more CMDB tables 232 that store CI data for one or more CIs associated with the operation of a managed client network 12. In certain embodiments, when executed, the applications 220 directly access the DB server 104 to retrieve and update data stored in one or more tables of the DB server 104 to provide the desired functionality.

In addition to data stored by the DB server 104, when executed, the applications 220 are designed to exchange data with the external services 228, including service 228A and service 228B in the illustrated example. It may be appreciated that the terms "internal" and "external" refer to communications relative to the client instance 102. In other words, an internal request 234 may be provided to the DIH server 222 by the (internal) application 220A, and the DIH server 222 may ultimately respond by providing an internal response 236 to the application. In contrast, the DIH server 222 may provide an external request 238 to external services 228 via the network 14, and may receive an external response 240 via the network 14 in reply. Additionally, as used here, the phrases "exchange data", "data exchange", "request", and "response" are intended to broadly encompass the movement of data via messages exchanged between the applications 220 and external services 228, as well as between external services 228 themselves. It may be appreciated that the terms "request" and "response" does not imply a particular direction that a substantial portion of the data is moving during the data exchange. For example, in certain cases, a request (e.g., an internal request 234 or an external request 238) may include a minimum amount of identifying data (e.g., a search request for a particular record based on an identifier), and the corresponding external response 240 to the request may include a substantial amount of detailed generated or retrieved by the services 228 based on this identifying data. In other cases, a request (e.g., an internal request 234 or an external request 238) may include a substantial amount of detailed data (e.g., details of a new purchase order to be created), and a corresponding external response 240 may merely include a confirmation message (e.g., a unique identifier for the created purchase order).

The DIH server 222 of the client instance 102 is designed and programmed to enable the applications 220 to exchange data with external services 228A and 228B. In certain embodiments discussed below, the DIH server 222 may additionally enable data exchange between external services 228A and 228B themselves. The DIH server 222 includes a registration module 242 having instructions that, when executed, enable the DIH server 222 to receive registration data 226 for services 228, and to store the received registration data 226 in the registration table 224, which registers the services 228 with the DIH server 222. The illustrated embodiment of the DIH server 222 includes an inbound queue 244 that is designed to receive and temporarily store incoming messages from the applications 220 and/or the services 228 until they are processed, as well as an outbound queue 246 that is designed to receive and store outbound messages from the applications 220 and/or the services 228 until they are delivered. The DIH server 222 also includes an exchange module 248 that is designed to process each incoming message (e.g., internal requests 234, external requests 238, and external responses 240) in the inbound queue 244 and generate outbound messages (e.g., internal responses 236, external requests 238, and external responses 240) in the outbound queue 246, in accordance with the registration data 226 stored in the registration table 224 for each of the services 228.

For the illustrated embodiment, the exchange module 248 of the DIH server 222 includes a set of conversion modules 250, each including instructions to enable the translation (e.g., conversion, transformation) of data contained in requests and responses (both internal and external) from a first data format to a second data format, wherein the second data format is suitable for consumption by the receiving applications 220 or services 228. A non-limiting list of example data formats includes Extensible Markup Language (XML), JavaScript Object Notation (JSON), Comma-Separated Value (CSV), or any other suitable data formats, or combinations thereof. For example, the conversion modules 250 may include standard conversion modules that convert data from a standard XML format into a standard JSON format, from a standard CSV format into a standard JSON format, from a standard JSON format into a standard XML format, and so forth. Such standard conversion modules 250 generally ensure that all of the data present when the data is in the first format remains after conversion. In certain embodiments, at least a portion of the conversion modules 250 may be pluggable modules, which can enable reduced memory usage compared to a non-pluggable design.

In certain embodiments, the conversion modules 250 may include customized conversion modules having instructions to handle nuances of data conversion for particular data sources that utilize proprietary or non-standard data formats. For example, service 228A may provide data (e.g., an external request 238 or external response 240) to the DIH server 222 using a first CSV format, in which the first row of CSV data stores column header names. In contrast, service 228B may use a different CSV format, in which the first row of CSV data does not store or include column header names. For such an example, the conversion modules 250 may include a first standard CSV conversion module for processing data received from service 228B, and include a second customized CSV conversion module for processing data received from service 228A. Other examples of customized conversion modules 250 include conversion modules having instructions to handle custom data formats used by the services 228, such as data having different sections in different data formats (e.g., an XML header section and a JSON body section), data having different control characters (e.g., a carriage return characters, carriage return line feed characters), data that should be truncated or scrubbed (e.g., removing unwanted data or shortening fields to a predetermined length), data that should be modified or converted (e.g., conversion of 32-bit real numbers into 64-bit real numbers), and so forth.

The DIH server 222 illustrated in FIG. 4 enables services 228 to provide registration data 226 to the DIH server 222, which is subsequently stored in the registration table 224 during the registration process discussed below with respect to FIG. 5. The registration data 226 generally informs the DIH server 222 how to contact and connect to the services 228, as well as which data formats the services 228 are expected to receive and provide. The registration data 226 received by the DIH server 222 may include any suitable information describing how the DIH server 222 should connect to, and exchange data with, the services 228.

For example, the registration data 226 received by the DIH server 222 and stored in the registration table 224 may include one or more protocols or communication architectures (e.g., Simple Object Access Protocol (SOAP), Hypertext Transfer Protocol (HTTP), Hypertext Transfer Protocol Secure (HTTPS), Secure Shell Protocol (SSH), File Transfer Protocol (FTP), Representational state transfer (REST)) for communicating with each of the services 228, and one or more authentication credentials or protocols (e.g., usernames/passwords, certificates, encryption keys) for connecting to each of the services 228. The registration data 226 may also include one or more locations (e.g., internet protocol (IP) addresses, ports, universal resource locators (URLs), domain names) associated with each of the services. The registration data 226 may also include one or more data formats (e.g., XML, JSON, CSV) that each of the services 228 will consume, as well as one or more data formats that each of the services 228 will provide as output. In certain embodiments, the registration data 226 may identify specific conversion modules 250 (e.g., customized conversion modules) to be used to convert data sent to, or received from, certain services 228.

It may be appreciated that, in certain embodiments, the registration data 226 may enable complex configurations for certain services 228. For example, the registration data 226 may indicate that a request to the service 228A for a price listing of products should be an HTTP POST to a publically accessible web domain that does not require authentication, and that the service 228A will respond to such a request with a XML file that includes the product price listing. The registration data 226 may further indicate that a different request to service 228A for a product sales data should instead be provided as a SSH request to a secure web domain associated with the service using particular authentication credentials, and that the service 228A will respond to such a request with a CSV file that includes the product sales data.

As discussed below with respect to FIGS. 6A and 6B, once the services 228 have been registered, the DIH server 222 illustrated in FIG. 4 enables the applications 220 to send data to, and to receive data from, each of the services 228. For such embodiments, the DIH server 222 acts as an intermediary between the applications 220 and the services 228, seamlessly handling communication, authentication, and data conversion. For example, the DIH server 222 can receive an internal request 234 from the application 220A to retrieve data from service 228A, convert the internal request 234 into an external request 238 of a suitable format for service 228A to consume, and then provide the external request 238 to the service 228A for fulfillment. Once service 228A has fulfilled the external request 238, the DIH server 222 may receive an external response 240 from the service 228A, convert the external response 240 into an internal response 236 of a suitable format for the application 220A to consume, and then provide the internal response 236 to the application 220A.

As discussed below with respect to FIGS. 7A and 7B, once the services 228 have been registered, the DIH server 222 illustrated in FIG. 4 enables the DIH server 222 to additionally or alternatively act as an intermediary between the services 228 themselves. For example, the DIH server 222 can receive an external request 238 from the service 228B to retrieve data from service 228A, convert the external request into a second external request 238 of a suitable format for consumption by service 228A, and then provide the second external request 238 to service 228A for fulfillment. Once service 228A has fulfilled the external request 238, the DIH server 222 may receive an external response 240 from service 228A, convert the external response into a second external response 240 of a suitable format for consumption by service 228B, and then provide the second external response 240 to service 228B.

Figure 5:
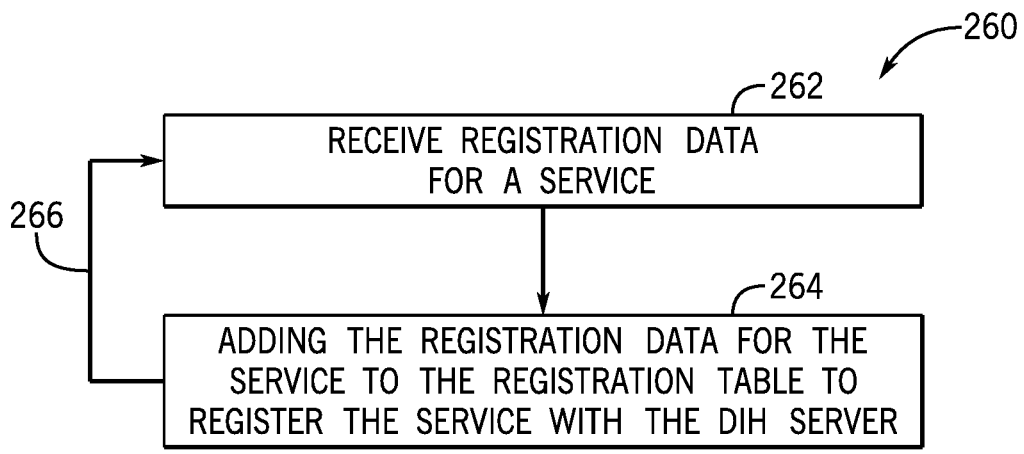
FIG. 5 is a flow diagram illustrating an embodiment of a process whereby the DIH server registers external services, in accordance with aspects of the present disclosure.

With the foregoing in mind, FIG. 5 is a flow diagram illustrating an embodiment of a process 260 (e.g., a registration process) whereby the DIH server 222 registers each of the services 228. In certain embodiments, the process 260 may be stored as instructions in a suitable memory (e.g., memory 206) and executed by a suitable processor (e.g., processor(s) 202) associated with the DIH server 222 and the client instance 102. The process 260 is merely illustrated as an example, and in other embodiments, the process 260 may include additional steps, omitted steps, repeated steps, and so forth, in accordance with the present disclosure. Additionally, the process 260 of FIG. 5 is discussed with reference to elements illustrated in FIG. 4.

For the embodiment illustrated in FIG. 5, the process 260 begins with the registration module 242 of the DIH server 222 receiving (block 262) registration data 226 for one of the services 228 (e.g., service 228A). For example, in certain embodiments, the DIH server 222 may receive the registration data 226 directly from the service 228A, which enables services 228 themselves to provide registration data 226 to inform the DIH server 222 how to communicate and exchange data with each of the services 228. In other embodiments, some or all of the registration data 226 may be received from the applications 220 hosted by the client instance 102, from a developer of the applications 220, or from a user of a client device 20 communicatively coupled to the cloud-based platform 16 hosting the client instance 102, as illustrated in FIG. 1.

For the embodiment of the process 260 illustrated in FIG. 5, in response to receiving the registration data 226, the DIH server 222 adds (blocks 264) the registration data for the service 228A to the registration table 224, which registers the service with the DIH server 222. Once the registration process 260 is complete, the applications 220 and/or other services 228 that have been registered can exchange data with the newly registered service, as discussed below with respect to FIGS. 6A and 6B and FIGS. 7A and 7B. Additionally, as indicated by the arrow 266, the DIH server 222 may subsequently receive new registration data 226 for a particular service (e.g., service 228A) after an initial registration, and, in response, the DIH server 222 may update the registration data 226 stored in the registration table 224 for the particular service 228A.

Figure 6A:
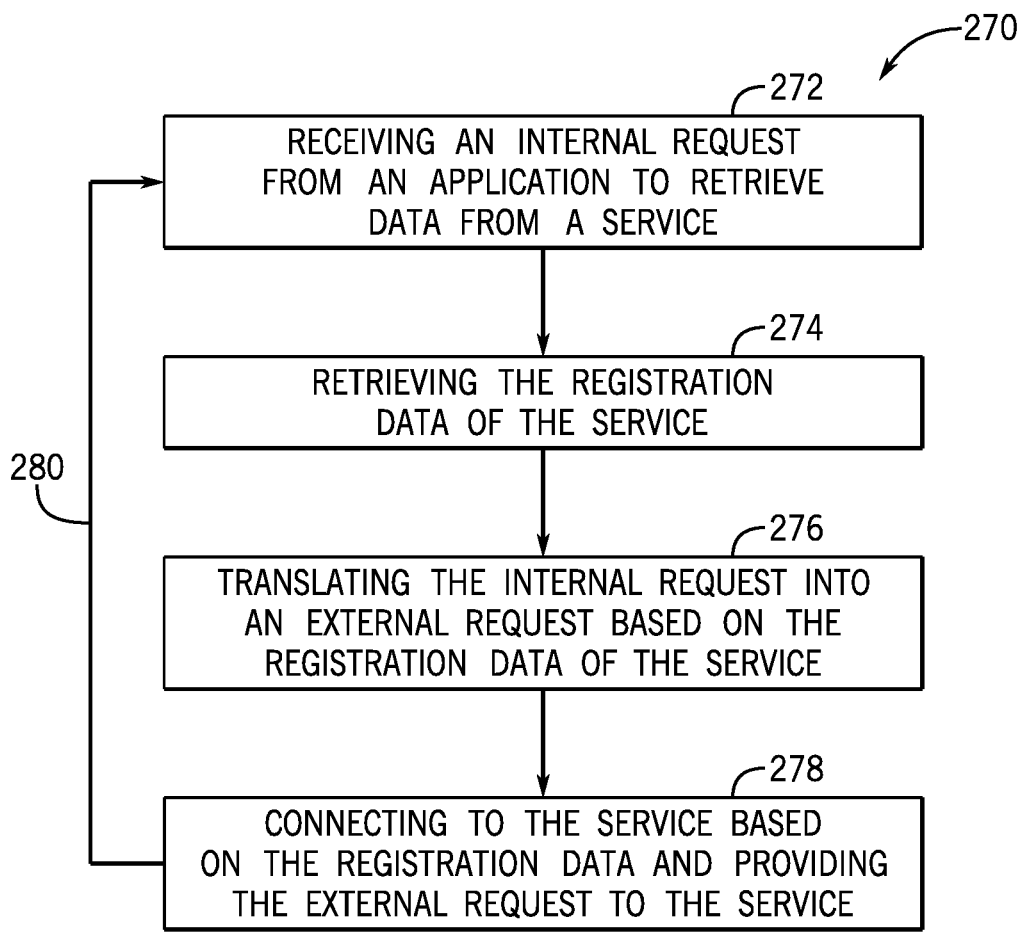
FIG. 6A is a flow diagram illustrating an embodiment of a process whereby the DIH server prepares and provides an external request to a registered external service in response to an internal request from an application hosted by the client instance, in accordance with aspects of the present disclosure.

FIG. 6A is a flow diagram illustrating an embodiment of a process 270 whereby, after a particular service (e.g., service 228A) has been registered, the DIH server 222 prepares and provides an external request 238 to the external service 228A in response to an internal request 234 from an application (e.g., application 220A) hosted by the client instance 102. In certain embodiments, the process 270 may be stored as instructions in a suitable memory (e.g., memory 206) and executed by a suitable processor (e.g., processor(s) 202) associated with the DIH server 222 and the client instance 102. The process 270 is merely illustrated as an example, and in other embodiments, the process 270 may include additional steps, omitted steps, repeated steps, and so forth, in accordance with the present disclosure. Additionally, the process 270 of FIG. 6A is discussed with reference to elements illustrated in FIG. 4.

The embodiment of the process 270 illustrated in FIG. 6A begins with the DIH server 222 receiving (block 272) an internal request 234 from an application (e.g., application 220A) hosted by the client instance 102 to retrieve data from a particular registered service (e.g., service 228A). As mentioned above, in certain cases, the internal request 234 may alternatively be a "request" that predominately provides data to the service 228A. In certain embodiments, internal request 234 received from application 220A is added to the inbound queue 244 of the DIH server 222 for processing, and the exchange module 248 of the DIH server 222 processes these requests of the inbound queue 244 in order, as discussed below.

For the embodiment of the process 270 illustrated in FIG. 6A, to process each internal request 234 in the inbound queue 244, the exchange module 248 of the DIH server 222 first retrieves (block 274), from the registration table 224, the stored registration data 226 for the service 228A. For example, the DIH server 222 may query the stored registration data 226 in the registration table 224 for service 228A and determine that, while the internal request 234 received from the application 220A is in a standard JSON format, service 228A expects an external request 238 to be provided in a standard XML format.

Based on the registration data 226 retrieved in block 274, the exchange module 248 of the DIH server 222 translates (block 276) the internal request 234 into an external request 238 using the appropriate conversion modules 250. The DIH server 222 then connects (block 278) to the service 228A, based on the aforementioned communication and authentication details in the registration data 226, and provides the generated external request 238 to the service 228A. In certain embodiments, the newly generated external request 238 is added to the outbound queue 246 of the DIH server 222 before being sent to the service 228A. As indicated by the arrow 280, the DIH server 222 may repeat the process 270 for each received internal request 234 from the applications 220 for data exchange with services 228.

Figure 6B:
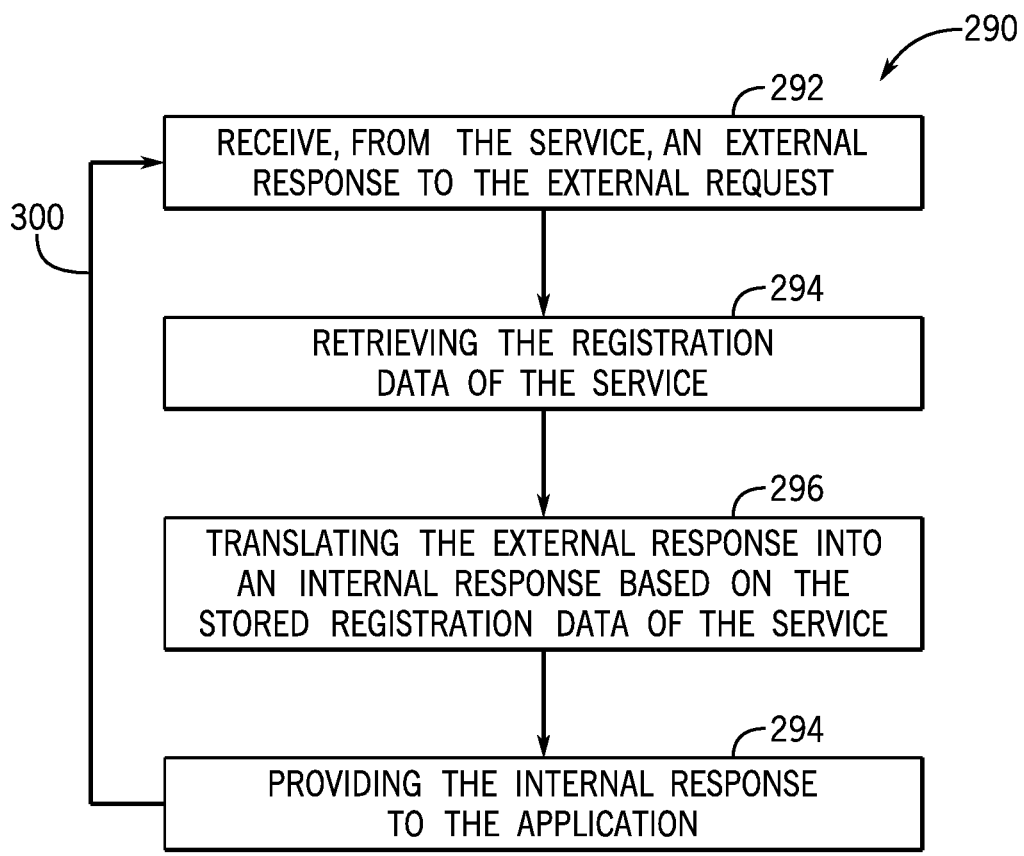
FIG. 6B is a flow diagram illustrating an embodiment of a process whereby the DIH server receives and processes an external response from the external service delivered in response to the external request provided to the service in FIG. 6A, in accordance with aspects of the present disclosure.

FIG. 6B is a flow diagram illustrating an embodiment of a process 290 whereby the DIH server 222 receives data from the service 228A in response to the external request 238 provided to the service 228A in block 278 of FIG. 6A. In certain embodiments, the process 290 may be stored as instructions in a suitable memory (e.g., memory 206) and executed by a suitable processor (e.g., processor(s) 202) associated with the DIH server 222 and the client instance 102. The process 290 is merely illustrated as an example, and in other embodiments, the process 290 may include additional steps, omitted steps, repeated steps, and so forth, in accordance with the present disclosure. Additionally, the process 290 of FIG. 6B is discussed with reference to elements illustrated in FIGS. 4 and 6A.

The embodiment of the process 290 illustrated in FIG. 6B begins with the DIH server 222 receiving (block 292) an external response 240 from the service 228A, wherein the external response 240 is a response to the previously provided external request 238. In certain embodiments, the external response 240 received from services 228 are added to the inbound queue 244 of the DIH server 222 for processing, and the exchange module 248 of the DIH server 222 processes these responses of the inbound queue 244 in order.

To process each external response 240 in the inbound queue 244, the exchange module 248 of the DIH server 222 first retrieves (block 294), from the registration table 224, the stored registration data 226 for service 228A. Based on this registration data 226, the exchange module 248 translates (block 296) the external response 240 into an internal response 236 that is suitable for consumption by the application 220A using one or more suitable conversion modules 250. The DIH server 222 then provides (block 298) the generated internal response 236 to application 220A. In certain embodiments, the generated internal response 236 is added to the outbound queue 246 of the DIH server 222 before being sent to application 220A. As indicated by the arrow 300, the DIH server 222 may repeat the process 290 for each external response 240 received by the DIH server 222 from the services 228. As noted above, the conversion modules 250 of the exchange module 248 enable the translation of data contained in the external response 240 from a first data format that is associated with the service 228A to a second data format that is consumable by the application 220A.

In addition to facilitating data exchange between applications 220 and services 228, it is presently recognized that the disclosed DIH server 222 can also facilitate data exchange between the services 228 themselves. That is, it is presently recognized that, once services 228 have been registered with the DIH server 222, the DIH server 222 is capable of communicatively coupling to, and exchanging data with, each of the services 228, regardless of the communication protocols, authentication processes, and/or data formats used by each of the services 228. As such, in certain embodiments, the DIH server 222 may additionally be configured to accept an external request 238 from a first registered service (e.g., service 228A), wherein the external request 238 is a request for data from a second registered service (e.g., service 228B). As noted above, in certain cases, the external request 238 may predominately provide data to, rather than retrieve data from, the second registered service 228B, in accordance with the present disclosure.

With the foregoing in mind, it may be appreciated that the disclosed DIH server 222 enables a single point of access for applications hosted by the client instance 102 and for registered services 228 to exchange data. Thus, after the registration process 260 of FIG. 5 is completed for the services 228, each of the services 228 can easily exchange data with both applications 220 and with other registered services 228, reducing development time, increasing code recycling, and reducing the potential to introduce coding errors or regressions, for example, during development of the applications 220, during the configuration of the services 228, or during creation of the conversion modules 250. In other words, the design of the disclosed DIH server 222 provides a unified platform that enables data exchange between applications 220 and services 228, as well as data exchange between services 228 themselves, to be performed in a common, centralized manner. Additionally, it may also be noted that, when service 228A is updated to use a different protocol or data format, updating the registration data of service 228A in the registration table 224 ensures that all data exchanges with service 228A, whether from the applications 220 or service 228B, utilize the correct protocol and data format of service 228A, which minimizes or reduces the cost of maintaining the DIH server 222.

Furthermore, in certain embodiments, the DB server 104 may include one or more tables (e.g., log or audit tables) that store information regarding each data exchange facilitated by the DIH server 222. For such embodiments, by having both data exchanges between the applications 220 and the services 228 and data exchanges between the services 228 themselves be managed by the DIH server 222, all external data exchanges involving or relating to the client instance 102 can be centrally tracked.

Figure 7A:
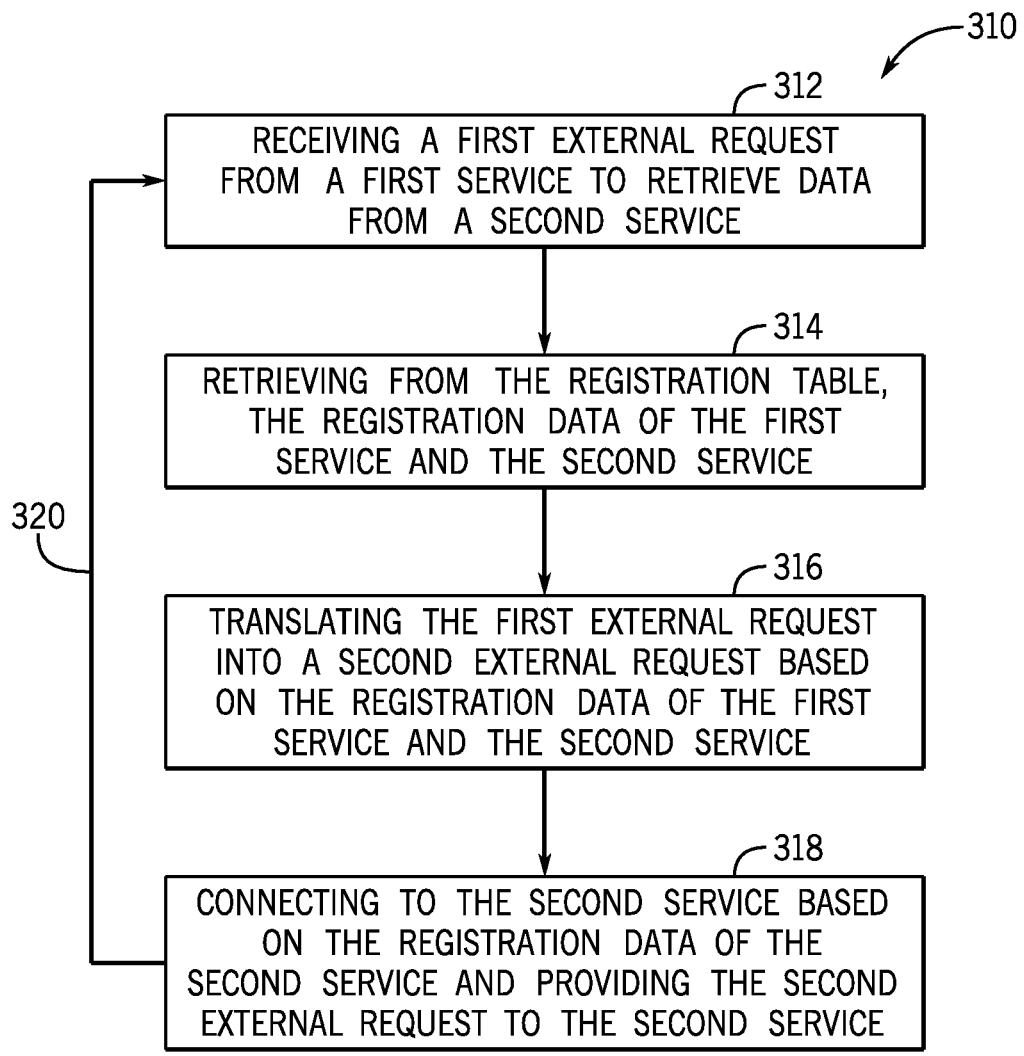
FIG. 7A is a flow diagram illustrating an embodiment of a process whereby the DIH server receives a first external request from a first registered external service and, in response, prepares and provides a second external request to a second registered external service, in accordance with aspects of the present disclosure.

With the foregoing in mind, FIG. 7A is a flow diagram illustrating an embodiment of a process 310 whereby, after service 228A and service 228B have been registered, service 228A sends data (e.g., a data request) to service 228B via the DIH server 222. In certain embodiments, the process 310 may be stored as instructions in a suitable memory (e.g., memory 206) and executed by a suitable processor (e.g., processor(s) 202) associated with the DIH server 222 and the client instance 102. The process 310 is merely illustrated as an example, and in other embodiments, the process 310 may include additional steps, omitted steps, repeated steps, and so forth, in accordance with the present disclosure. Additionally, the process 310 of FIG. 7A is discussed with reference to elements illustrated in FIG. 4.

The embodiment of the process 310 illustrated in FIG. 7A begins with the DIH server 222 receiving (block 312) a first external request from the service 228A to retrieve data from service 228B. As noted, in certain cases, the first external request 238 may predominately provide data from service 228A to service 228B. In certain embodiments, each external request 238 received from services 228 is added to the inbound queue 244 of the DIH server 222 for processing, and the exchange module 248 of the DIH server 222 processes these requests of the inbound queue 244 in order.

As noted above, the exchange module 248 includes a number of conversion modules 250, each having instructions that enable the translation of data contained in the external requests 238 from a first data format to a second data format. To process each external request 238 in the inbound queue 244, the exchange module 248 of the DIH server 222 first retrieves (block 314), from the registration table 224, the stored registration data 226 for the service 228A and service 228B. Using the registration data 226 for these services 228, the exchange module 248 translates (block 316) the first external request into a second external request that is suitable for consumption by service 228B. Additionally, the DIH server 222 connects (block 318) to service 228B based on the aforementioned communication and authentication information in the registration data 226 and provides the external request 238 to the service 228B. In certain embodiments, the generated external request 238 is added to the outbound queue 246 of the DIH server 222 before being sent to the service 228B. As indicated by the arrow 320, the DIH server 222 may repeat the process 310 for each received external request 238 for data exchange with the services 228.

Figure 7B:
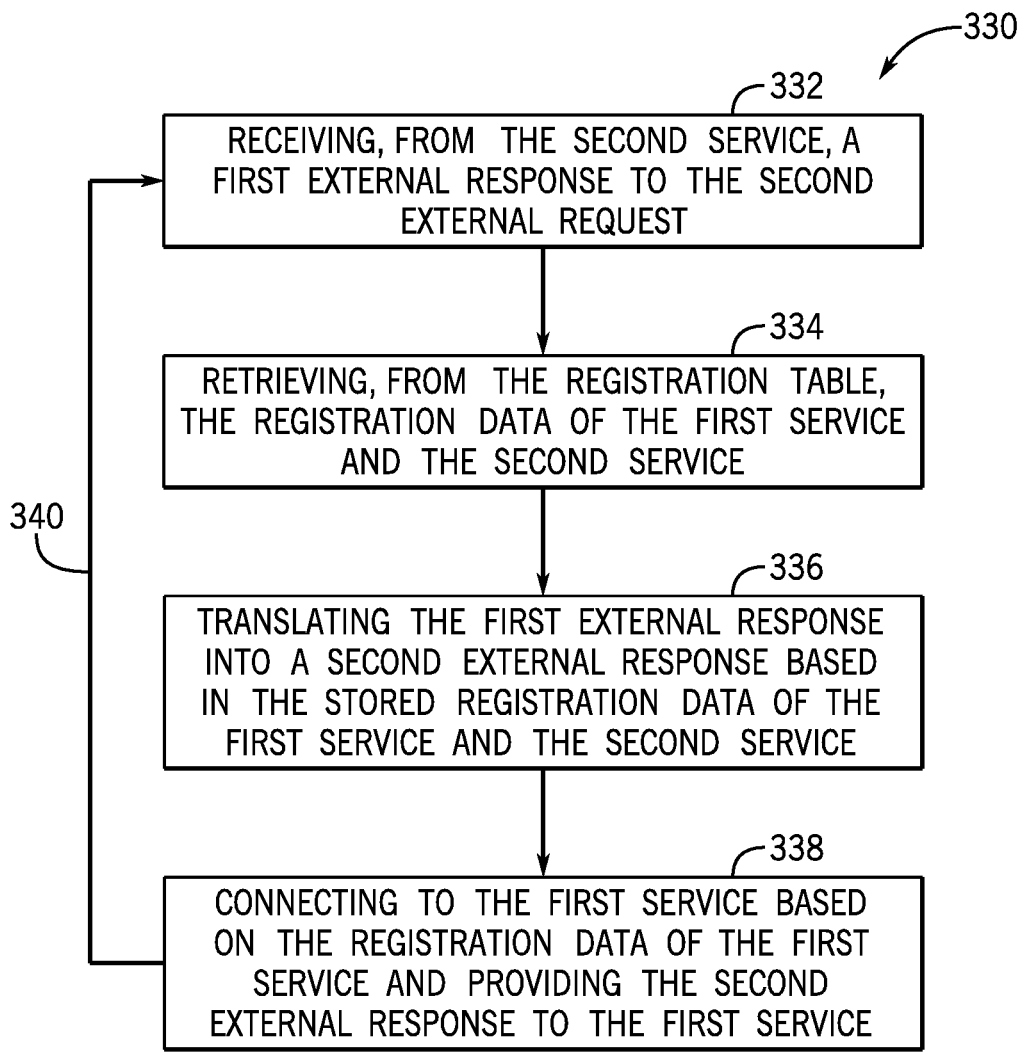
FIG. 7B is a flow diagram illustrating an embodiment of a process whereby the DIH server receives and processes an external response from the second registered external service delivered in response to the external request provided to the second registered external service in FIG. 7A, in accordance with aspects of the present disclosure.

FIG. 7B is a flow diagram illustrating an embodiment of a process 330 whereby the DIH server 222 receives data from the service 228B in response to the external request 238 provided to the service 228B in block 318 of FIG. 7A. In certain embodiments, the process 330 may be stored as instructions in a suitable memory (e.g., memory 206) and executed by a suitable processor (e.g., processor(s) 202) associated with the DIH server 222 and the client instance 102. The process 330 is merely illustrated as an example, and in other embodiments, the process 330 may include additional steps, omitted steps, repeated steps, and so forth, in accordance with the present disclosure. Additionally, the process 330 of FIG. 7B is discussed with reference to elements illustrated in FIGS. 4 and 7A.

The embodiment of the process 330 illustrated in FIG. 7B begins with the DIH server 222 receiving (block 332) a first external response 240 from the service 228B, wherein the external response 240 is a response to the external request 238 provided to service 228B in FIG. 7A. In certain embodiments, the external responses 240 received from services 228 are added to the inbound queue 244 of the DIH server 222 for processing, and the exchange module 248 of the DIH server 222 processes the external responses 240 of the inbound queue 244 in order.

For the embodiment illustrated in FIG. 7B, to process each external response 240 in the inbound queue 244, the exchange module 248 of the DIH server 222 first retrieves (block 334), from the registration table 224, the stored registration data 226 for the service 228A and service 228B. Using this registration data 226, the exchange module 248 translates (block 336) the first external response into a second external response 240 that is in a data format consumable by the service 228A. Additionally, the DIH server 222 connects (block 338) to service 228A, using the communication and authentication details in the stored registration data 226 for service 228A, and then provides the second external response 240 to the service 228A. In certain embodiments, the generated second external response 240 is added to the outbound queue 246 of the DIH server 222 before being sent to the service 228A. As indicated by the arrow 340, the DIH server 222 may repeat the process 330 for each external response 240 received from the services 228. As noted above, the conversion modules 250 of the exchange module 248 enable the translation of data contained in the external response 240 from a first data format that is associated with service 228B to a second data format that is suitable for consumption by service 228A.

In certain embodiments, the DIH server 222 may be configured to facilitate data exchange between multiple applications 220 and/or services 228 as part of a complex data exchange operation. For example, application 220A may provide an initial internal request 234 to the DIH server 222 that results in the DIH server 222 performing a first data exchange with service 228A to retrieve a first set of data (e.g., a reference number), and then performing a subsequent data exchange with service 228B using the retrieved first set of data, wherein the external response 240 from service 228B is subsequently translated and returned to the application 220A as an internal response 236 to the initial internal request 234. In another example, application 220B may provide a request to the DIH server 222 that results in the DIH server 222 sending a data request to service 228A. In response to receiving the data request, service 228A may perform a second data exchange with service 228B via the DIH server 222 to retrieve data from service 228B, and then use the retrieved data to provide an external response 240 to the DIH server 222 that is subsequently translated and provided to the application 220B as an internal response 236 to the initial internal request 234. In certain embodiments, the services 228 may be registered with the DIH server 222 such that each communication (e.g., each external request 238 and external response 240) with each of the services 228 may be configured to use a different communication protocol, different authentication credentials, and/or different data formats. In other embodiments, each of the services 228 may be registered with the DIH server 222 such that each of the services 228 are respectively configured to receive all external requests 238 and provide all external responses 240 using a particular communication protocol (e.g., FTP, HTTPS, REST) and a particular data format (e.g., XML, JSON, CVS) that are specific to each of the services 228.

The technical effects of the present disclosure include a DIH server that enables seamless data exchange between applications hosted by a client instance and one or more external services. Once the external services have been registered, the DIH server enables applications hosted by the client instance to send data to, and to receive data from, these external services, while handling communication, authentication, and data conversion. Additionally, the DIH server can additionally or alternatively act as an intermediary to exchange data between registered services themselves. As such, the disclosed DIH server can provide a single point of access for applications hosted by the client instance and registered services to exchange data, reducing development time, increasing code recycling, and reducing the potential to introduce coding errors or regressions during application development. Additionally, by managing all communications with external services via the DIH server, the disclosed system provides a centralized platform to track and monitor all data exchanges between the client instance and the external services.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
at least one memory including a registration table that is configured to store registration data of a first external service and registration data of a second external service; and
at least one processor configured to execute stored instructions to perform actions comprising:
receiving, from the first external service, a first external request to retrieve data from the second external service, wherein the first external request has a first data format;
retrieving, from the registration table, the registration data of the first external service and the registration data of the second external service;
translating the first external request into a second external request having a second data format based on the registration data of the first external service, based on the registration data of the second external service, or a combination thereof;
connecting to the second external service based on the registration data of the second external service; and
providing the second external request to the second external service.

2. The computing system of claim 1, wherein the first data format is Extensible Markup Language (XML), JavaScript Object Notation (JSON), or Comma-Separated Value (CSV), wherein the second data format is XML, JSON, or CSV, and wherein the first data format and the second data format are different.

3. The computing system of claim 1, wherein the at least one processor is configured to execute the stored instructions to perform actions comprising:
receiving, in response to the second external request, a first external response from the second external service, wherein the first external response has a third data format;
translating the first external response into a second external response having a fourth data format based on the registration data of the first external service, the registration data of the second external service, or a combination thereof; and
providing the second external response to the first external service to fulfill the first external request.

4. The computing system of claim 3, wherein, to receive the first external request from the first external service, and to provide the second external response to the first external service, the at least one processor is configured to execute the stored instructions to perform actions comprising:
communicating with the first external service using at least one protocol indicated in the registration data of the first external service, wherein the at least one protocol comprises Simple Object Access Protocol (SOAP), Hypertext Transfer Protocol (HTTP), Hypertext Transfer Protocol Secure (HTTPS), Secure Shell Protocol (SSH), File Transfer Protocol (FTP), or Representational state transfer (REST).

5. The computing system of claim 3, wherein, to connect to the second external service, to provide the second external request to the second external service, and to receive the first external response from the second external service, the at least one processor is configured to execute the stored instructions to perform actions comprising:
communicating with the second external service using at least one protocol indicated in the registration data of the second external service, wherein the at least one protocol comprises Simple Object Access Protocol (SOAP), Hypertext Transfer Protocol (HTTP), Hypertext Transfer Protocol Secure (HTTPS), Secure Shell Protocol (SSH) computing, File Transfer Protocol (FTP), or Representational state transfer (REST).

6. The computing system of claim 1, wherein the at least one memory is configured to store a plurality of conversion modules, and wherein, to translate the first external request, the at least one processor is configured to execute the stored instructions to perform actions comprising:
using a particular conversion module of the plurality of conversion modules to translate the first external request into the second external request having the second data format, wherein the particular conversion module is indicated in the registration data of the first external service, in the registration data of the second external service, or a combination thereof.

7. The computing system of claim 1, wherein, before receiving the first external request from the first external service, the at least one processor is configured to execute the stored instructions to perform actions comprising:
receiving the registration data of the first external service; and
storing the registration data of the first external service in the registration table.

8. The computing system of claim 1, wherein, before receiving the first external request from the first external service, the at least one processor is configured to execute the stored instructions to perform actions comprising:
receiving the registration data of the second external service; and
storing the registration data of the second external service in the registration table.

9. The computing system of claim 1, wherein the at least one memory is configured to store an application of a client instance that is configured to exchange data with the first external service via the computing system, and wherein the at least one processor is configured to execute the stored instructions to perform actions comprising:
receiving, from the application, an internal request to retrieve data from the first external service, wherein the internal request has a third data format;

retrieving, from the registration table, the registration data of the first external service;

translating the internal request into a third external request having the first data format based on the registration data of the first external service;

connecting to the first external service based on the registration data of the first external service;

providing the third external request to the first external service;

receiving, in response to the third external request, a third external response from the first external service, wherein the third external response has the first data format;

translating the third external response into an internal response having the third data format based on the registration data of the first external service; and providing the internal response to the application to fulfill the internal request.

10. The computing system of claim 9, wherein the at least one memory is configured to store a configuration management database (CMDB), and wherein the application is configured to access and modify CMDB data in the CMDB based on the internal response provided by the computing system.

11. A computer-implemented method, comprising:

receiving registration data of a first external service and registration data of a second external service;

receiving, from the first external service, a first external request to retrieve data from the second external service, wherein the first external request has a first data format;

translating the first external request into a second external request having a second data format based on the registration data of the first external service, based on the registration data of the second external service, or a combination thereof;

connecting to the second external service based on the registration data of the second external service; and providing the second external request to the second external service.

12. The computer-implemented method of claim 11, wherein the registration data of the first external service or the registration data of the second external service comprises location information, protocol information, authentication information, and data format information.

13. The computer-implemented method of claim 11, comprising:

receiving, in response to the second external request, a first external response from the second external service, wherein the first external response has a third data format;

translating the first external response into a second external response having a fourth data format based on the registration data of the first external service, the registration data of the second external service, or a combination thereof; and providing the second external response to the first external service to fulfill the first external request.

14. The computer-implemented method of claim 11, comprising:

storing the received registration data of the first external service and the received registration data of the second external service in a registration table; and retrieving, from the registration table, the registration data of the first external service and the registration data of the second external service in response to receiving the first external request from the first external service.

15. The computer-implemented method of claim 11, wherein the first data format and the second data format are different and independently selected from the group consisting of: Extensible Markup Language (XML), JavaScript Object Notation (JSON), and Comma-Separated Value (CSV).

16. A non-transitory, computer-readable medium storing instructions executable by a processor of a computing system, the instructions comprising instructions to:

receive registration data of a first external service and registration data of a second external service;

receive, from the first external service, a first external request to retrieve data from the second external service, wherein the first external request has a first data format;

translate the first external request into a second external request having a second data format based on the registration data of the first external service, the registration data of the second external service, or a combination thereof;

connect to the second external service based on the registration data of the second external service;

provide the second external request to the second external service;

receive, in response to the second external request, a first external response from the second external service, wherein the first external response has a third data format;

translate the first external response into a second external response having a fourth data format based on the registration data of the first external service, the registration data of the second external service, or a combination thereof; and provide the second external response to the first external service to fulfill the first external request.

17. The non-transitory, computer-readable medium of claim 16, wherein the first and the fourth data formats are the same data format and the second and the third data formats are the same data format.

18. The non-transitory, computer-readable medium of claim 16, wherein the registration data of the first external service is received from the first external service and the registration data of the second external service is received from the second external service.

19. The non-transitory, computer-readable medium of claim 18, wherein the instructions comprise instructions to:

store the registration data of the first external service and the registration data of the second external service; and retrieve the registration data of the first external service and the registration data of the second external service in response to receiving the first external request from the first external service.

20. The non-transitory, computer-readable medium of claim 16, wherein the instructions to translate the first external response into the second external response comprise instructions to:

use a custom conversion module to translate the first external response in the third data format into the second external response having the fourth data format, wherein the custom conversion module is indicated in the registration data of the first external service, in the registration data of the second external service, or a combination thereof.

* * * * *

UNITED STATES PATENT AND TRADEMARK OFFICE
CERTIFICATE OF CORRECTION

| | |
|---|---|
| PATENT NO. | : 11,722,547 B2 |
| APPLICATION NO. | : 17/448305 |
| DATED | : August 8, 2023 |
| INVENTOR(S) | : Arun Vydianathan and Debraj Chakraborty |

It is certified that error appears in the above-identified patent and that said Letters Patent is hereby corrected as shown below:

In the Claims

Column 17, Claim 1, Line 44, delete "based on".

Column 19, Claim 11, Line 34, delete "based on".

Signed and Sealed this
Fourteenth Day of November, 2023

Katherine Kelly Vidal
*Director of the United States Patent and Trademark Office*